US010021257B2

(12) United States Patent
Li (10) Patent No.: US 10,021,257 B2
(45) Date of Patent: Jul. 10, 2018

(54) OPERATION PANEL FOR IMAGING DEVICE AND IMAGING DEVICE

(71) Applicant: ZHUHAI SEINE TECHNOLOGY CO., LTD., Zhuhai (CN)

(72) Inventor: Yang Li, Zhuhai (CN)

(73) Assignee: ZHUHAI SEINE TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 15/534,896

(22) PCT Filed: Sep. 16, 2015

(86) PCT No.: PCT/CN2015/089727
§ 371 (c)(1),
(2) Date: Jun. 9, 2017

(87) PCT Pub. No.: WO2016/090983
PCT Pub. Date: Jun. 16, 2016

(65) Prior Publication Data
US 2017/0346968 A1    Nov. 30, 2017

(30) Foreign Application Priority Data

Dec. 11, 2014   (CN) .......................... 2014 1 0764584

(51) Int. Cl.
*B41J 29/02*     (2006.01)
*H04N 1/00*     (2006.01)
*F16C 11/10*     (2006.01)

(52) U.S. Cl.
CPC .......... *H04N 1/00496* (2013.01); *B41J 29/02* (2013.01); *F16C 11/10* (2013.01);
(Continued)

(58) Field of Classification Search
CPC ........... H04N 1/00496; H04N 1/00408; H04N 1/00557; H04N 1/00559; B41J 29/02
See application file for complete search history.

(56) References Cited

U.S. PATENT DOCUMENTS 7,789,487 B2 *   9/2010   Kawamura ............ B41J 2/1752
347/49
7,891,657 B2 *   2/2011   Fujita ....................... B65H 3/06
271/114
(Continued)

FOREIGN PATENT DOCUMENTS

CN    1655016 A    8/2005
CN    102809907 A    12/2012
(Continued)

OTHER PUBLICATIONS

The World Intellectual Property Organization (WIPO) International Search Report for PCT/CN2015/089727 dated Dec. 23, 2015 6 Pages.
(Continued)

*Primary Examiner* — Lamson Nguyen
(74) *Attorney, Agent, or Firm* — Anova Law Group, PLLC (57) ABSTRACT

The present disclosure discloses an operation panel for an imaging device and an imaging device thereof. The operation panel comprises: a panel body hinged to a connector through a pin shaft; a positioning system comprising a first ratchet wheel and a backstop, wherein the first ratchet wheel is sleeved on the pin shaft and coupled to the panel body, the backstop is arranged on the connector and configured to clamp the first ratchet wheel when the first ratchet wheel rotates reversely so as to position the first ratchet wheel, and the backstop is coupled to the connector and slides at least in a direction parallel to an axial direction of the pin shaft; and a driving system coupled to the backstop and configured to drive the backstop to slide at least in the direction parallel to the axial direction of the pin shaft.

18 Claims, 10 Drawing Sheets

(52) U.S. Cl.
CPC ..... *H04N 1/00408* (2013.01); *H04N 1/00557* (2013.01); *H04N 1/00559* (2013.01); *F16C 2324/00* (2013.01); *H04N 2201/0082* (2013.01)

(56) References Cited

U.S. PATENT DOCUMENTS 8,085,432 B2 * 12/2011 Hattori ............... H04N 1/00525
347/214
9,248,653 B2 * 2/2016 Yoda ........................ B41J 2/175

FOREIGN PATENT DOCUMENTS

| CN | 203248956 U | 10/2013 |
|---|---|---|
| CN | 103557414 A | 2/2014 |
| CN | 103574236 A | 2/2014 |
| CN | 104172777 A | 12/2014 |
| CN | 104527237 A | 4/2015 |
| CN | 204296225 U | 4/2015 |
| EP | 0953798 A2 | 11/1999 |
| JP | H05204863 A | 8/1993 |
| JP | 2007164331 A | 6/2007 |
| WO | 2013116345 A1 | 8/2013 |

OTHER PUBLICATIONS

China Intellectual Property Organization (SIPO) Search Report for 201410764584X dated Mar. 24, 2016 2 Pages.

* cited by examiner

OPERATION PANEL FOR IMAGING DEVICE AND IMAGING DEVICE

CROSS-REFERENCES TO RELATED APPLICATIONS

This application is a national stage patent application of PCT application No. PCT/CN2015/089727, filed on Sep. 16, 2015, which claims priority to Chinese Patent Application No. 201410764584.X, filed on Dec. 11, 2014, the entire content of all of which is incorporated herein by reference.

FIELD OF THE INVENTION

The present disclosure relates to the technical field of imaging devices, and more specifically, relates to an operation panel for imaging device and an imaging device thereof.

BACKGROUND

In recent years, with the rapid development of technologies in printing industry, printers trend to have more and more perfect and diversified functions.

An operation panel is often provided on the main body of an existing copy machine and printer, which allow users to input an instruction on the operation panel for executing a task.

However, due to a positional relationship between the user's viewing angle and an indoor lighting device, light reflection may be generated on the operation panel, which may reduce the visibility of the information displayed on the operation panel and bring inconvenience to the users.

BRIEF SUMMARY OF THE DISCLOSURE

In view of this, the present disclosure provides an operation panel for imaging device and an imaging device thereof, to improve the visibility of the information displayed on the operation panel and the operation convenience.

One aspect of the present disclosure provides an operation panel for an imaging device, comprising:
- a panel body, wherein the panel body is hinged to a connector through a pin shaft, the connector is coupled to a house of the imaging device, a torsion spring is sleeved on the pin shaft, the torsion spring has a first torsion arm fixedly coupled to the panel body, and a second torsion arm fixedly coupled to the connector;
- a positioning system, comprising:
  - a first ratchet wheel sleeved on the pin shaft and coupled to the panel body, wherein the panel body drives the first ratchet wheel to rotate around the pin shaft, and
  - a backstop arranged on the connector, wherein the backstop is configured to cooperate with the first ratchet wheel so as to enable the first ratchet wheel to be rotated forward, and configured to clamp a first paw of the first ratchet wheel when the first ratchet wheel rotates reversely so as to position the first ratchet wheel, and the backstop is coupled to the connector in a sliding manner and slides at least in a direction parallel to an axial direction of the pin shaft; and
- a driving system coupled to the backstop and configured to drive the backstop to slide at least in the direction parallel to the axial direction of the pin shaft, such that the backstop departs from the first ratchet wheel.

Another aspect of the present disclosure provides an imaging device comprising a house and an operation panel according to the disclosed embodiments, wherein the house is coupled to the connector.

According to the above description, the operation panel provided in the present discourse may have the connector coupled to the house of the image device. When the user desires to adjust the angle of the panel body with respect to the house 201, the panel body is turned over from the initial position. When turning over the panel body, the panel body rotates around the pin shaft with respect to the connector 103, during which the panel body drives the first ratchet wheel to rotate forward around the pin shaft while the torsion spring is compressed. When the user adjusts the panel body to the desired position and releases the panel body, the compressed torsion spring 104 applies a force to the connector and the panel body, such that the panel body rotates reversely with respect to the connector. Accordingly, the panel body drives the first ratchet wheel to rotate reversely around the pin shaft. At this moment, the backstop is configured to clamp the first paw of the first ratchet wheel so as to position the first ratchet wheel. Thus, the panel body is positioned with respect to the connector, which facilitates the user to view the information displayed on the display panel of the panel body and to perform the related input operation from a desired angle. Thus, the influence of the reflection on the display information is reduced, and the visibility of the information displayed on the operation panel and operation convenience is improved. When the positioning of the panel body is desired to be released, the user relies on the driving system to drive the backstop in a direction parallel to the axial direction of the pin shaft, such that the backstop departs from the first ratchet wheel. Thus, the backstop no longer clamps the first pawls, and the positioning of the panel body is released. The compressed torsion spring applies a force to the connector and the panel body, such that the panel body rotates reversely around the connector. Then the panel body is recovered to the initial position, realizing a convenient operation.

In FIGS. 1-13, the various reference numerals and corresponding names are as follows:

101: panel body; 102: pin shaft; 103: connector;
104: torsion spring; 105: backstop; 106: first ratchet wheel;
107: first pawl; 108: resilient return device; 109: first plane;
110: first slant 111: second pawl 112: second plane,
113: second slant 114: drive lever 115: guide hole,
116: guide block, 117: guide groove, 118: drive handle,
119: handle portion, 120: driver portion, 121: guide rail,
122: stopper, 123: drive block, 124: slant,
125: strip hole 126: drive sleeve 127: drive end,
128: curved convex platform; 201: house; A: straight-line.

DETAILED DESCRIPTION

Referring to FIGS. 1-5, the present disclosure provides an operation panel for imaging device. The operation panel for imaging device may comprise: a panel body 101 hinged to a connector 103 through a pin shaft 102, the connector 103 may be configured to be coupled to a house 201 of the image device, a torsion spring 104 may be sleeved on the pin shaft 102, the torsion spring 104 may have a first torsion arm fixedly coupled to the panel body 101, and a second torsion arm fixedly coupled to the connector 103; a positioning system comprising a first ratchet wheel 106 and a backstop 105, the first ratchet wheel 106 may be sleeved on the pin shaft 102 and coupled to the panel body 101, the panel body 101 may be capable of driving the first ratchet wheel 106 to rotate around the pin shaft 102, the backstop 105 may be arranged on the connector 103, and may be configured to cooperate with the first ratchet wheel 106 so as to enable the first ratchet wheel 106 to be rotated forward, and configured to clamp the first ratchet wheel 106 when the first ratchet wheel 106 rotates reversely so as to position the first ratchet wheel 106, and the backstop 105 may be coupled to the connector 103 in a sliding manner, and may slide at least in a direction parallel to an axial direction of the pin shaft 102; and a driving system coupled to the backstop 105 and configured to drive the backstop to slide at least in the direction parallel to the axial direction of the pin shaft 102, such that the backstop 105 may be able to depart from the first ratchet wheel 106.

In the disclosed operation panel for imaging device, the connector 103 may be coupled to the house 201 of the image device. When the user desires to adjust the angle of the panel body 101 with respect to the house 201, the panel body 101 may be turned over from the initial position. When turning over the panel body 101, the panel body 101 may rotate with respect to the connector 103, during which the panel body 101 may drive the first ratchet wheel 106 to rotate around the pin shaft 102 while the torsion spring 104 may be compressed.

When the user adjusts the panel body 101 to the desired position and releases the panel body 101, the compressed torsion spring 104 may apply a force to the connector 103 and the panel body 101, to reverse the rotation of the panel body 101 with respect to the connector 103. Accordingly, the panel body 101 may drive the first ratchet wheel 106 to rotate reversely about the pin shaft 102. At this moment, the backstop 105 may be configured to clamp the first paw 107 of the first ratchet wheel 106 so as to position the first ratchet wheel 106, which may facilitate the user to view the information displayed on the display panel of the panel body 101 and perform the related input operation from a desired angle. Thus, the influence of the reflection on the display information may be reduced, and the visibility of the information displayed on the operation panel and operation convenience may be improved.

When the positioning of the panel body 101 is desired to be released, the user may rely on the driving system to drive the backstop 105 in a direction parallel to the axial direction of the pin shaft 102, such that the backstop 105 may depart from the first ratchet wheel 106. Thus, the backstop 105 may no longer clamp the first pawls 107, and the positioning of the panel body 101 may be released. The compressed torsion spring 104 may force the connector 103 and the panel body 101 to reverse the rotation of the panel body 101 relative to the connector 103, and then the panel body 101 may be recovered to the initial position, which is featured with a convenient operation.

In the disclosed embodiments, optionally, the backstop 105 may be able to slide in a direction parallel to the axial direction of the pin shaft 102. The driving system may be coupled to the backstop 105 and configured to drive the backstop 105 to slide in the direction parallel to the axial direction of the pin shaft 102, such that the backstop 105 may be able to depart from the first ratchet wheel 106. Thus, the backstop 105 may slide smoothly, and may function reliably.

In the disclosed embodiments, optionally, the operation panel for the imaging device may further include a resilient return device 108. The resilient return device 108 may be coupled between the connector 103 and the backstop 105, disposed parallel to the axial direction of the pin shaft 102. The resilient return device 108 may be configured to apply a force to the backstop 105, such that after the backstop 105 releases the positioning of the panel body 101, the backstop 105 may be able to return to a position where the backstop 105 is able to cooperate with the first ratchet wheel 106 to realize a positioning. Thus, after the user adopts the driving system to drive the backstop 105 to depart from the first ratchet wheel 106, the backstop 105, driven by the resilient return device 108, may return to a position where the backstop 105 is able to cooperate with the first ratchet wheel 106 to realize a positioning, thereby facilitating the next positioning.

In the disclosed embodiments, optionally, the first pawls 107 may be provided at a first end surface of the first ratchet wheel 106, and a second end surface of the first ratchet wheel 106 may be fixedly coupled to the panel body 101. The first pawls 107 may include a plurality of first planes 109 distributed circumferentially along the first ratchet wheel 106, and the first planes 109 may extend in the axial and radial directions of the first ratchet wheel 106. The top of a first plane 109 and the bottom of an adjacent first plane 109 may be coupled by a first slant 110 to form a protrusion.

The two adjacent first planes 109 forming the protrusion each may have a first angel with respect to the first slant 110. The backstop 105 may be a second ratchet wheel, which may be sleeved on the pin shaft 102 and slidably coupled to the pin shaft 102. The first end surface of the second ratchet wheel may be provided with a second paw 111. The second pawl 111 may include a plurality of second planes 112 distributed circumferentially along the second ratchet wheel, and the second planes 112 may extend in the axial and radial directions of the second ratchet wheel. The top of a second plane 112 and the bottom of an adjacent second plane 112 may be coupled by a second slant 113 to form a protrusion. The two adjacent second planes 112 forming the protrusion each may have a second angel with respect to the second slant 113. The second ratchet wheel may cooperate with the first ratchet wheel 106. In particular, the second plane 112 may be configured to be engaged with the first plane 109 to position the first ratchet wheel 106, and the second slant 113 may slide relative to the first slant 110 to rotate the first ratchet wheel 106 in a forward direction relative to the second ratchet wheel.

In the disclosed embodiments, optionally, the first pawls 107 and the second pawls 111 may be circumferentially uniformly distributed on the first plane 109 of the first ratchet wheel 106 and the second plane 112 of the second ratchet wheel, respectively. Thus, the first pawls 107 and the second pawls 111 may cooperate with each other to realize a reliable positioning, and a convenience operation.

In the disclosed embodiments, optionally, when the user desires to adjust the angle of the panel body 101 with respect to the house 201, the panel body 101 may be turned over from the initial position. When turning over the panel body 101, the panel body 101 may rotate with respect to the connector 103, during which the panel body 101 may drive the first ratchet wheel 106 to forward rotate around the pin shaft 102. When the first ratchet wheel 106 forward rotates around the pin shaft 102, the second slant 113 may slide relative to the first slant 110. Under the interaction of the second slant 113 with the first slant 110, the second ratchet wheel may generate a displacement in the axial direction of the pin shaft 102 to move far away from the first ratchet 106. When the first slant 110 slides over the second slant 113, the second ratchet wheel, driven by the resilient return device 108, may move along the axial direction of the pin shaft 102 to approach the first ratchet wheel 106, and return to a position where the second ratchet wheel is able to cooperate with the first ratchet wheel 106 to realize a positioning. At this moment, the first plane 109 may be in contact with the second plane 112. The torsion spring 104 may be compressed during the rotation. When the panel body 101 is adjusted to a desired position and then released by the user, the compressed torsion spring 104 may apply a force to the connector 103 and the panel body 101, thereby reversing the rotation of the panel body 101 with respect to the connector 103. The panel body 101 may drive the first ratchet wheel 106 to rotate reversely about the pin shaft 102. At this moment, the second plane 112 may clamp the first plane 109 so as to position the panel body 101 with respect to the connector 103. The positing system may be featured with a simple structure, a reliable positioning, and a convenient operation.

The first pawls 107 may also be provided in a radial direction of the first ratchet wheel 106, and the backstop 105 may be an elastic latch, which is not limited by the present disclosure.

In the disclosed embodiments, optionally, the first angle may be configured to be approximately 30 to 60 degrees, and the second angle may be configured to be approximately 30 to 60 degrees. Thus, when the first slant 110 and the second slant 113 relatively slide, the force between the first slant 110 and the second slant 113 may be more uniform, and the sliding may be smoother, thereby improving the user experience of operation.

In the disclosed embodiments, optionally, the first angle may be 45 degrees and the second angle may be 45 degrees. Thus, when the first slant 110 and the second slant 113 relatively slide, between the first slant 110 and the second slant 113 may be more uniform and the sliding may be smoother, thereby further improving the user experience of operation.

In the disclosed embodiments, optionally, the driving system may be a drive lever 114, which is coupled to the backstop 105. The user may apply a force to the drive lever 114, through which the drive lever 114 may drive the backstop 105 to slide along the axial direction of the pin shaft 102, such that the backstop 105 may depart from the first ratchet wheel 106 to release the positioning. Thus, the driving system may have a simple structure and easy operation. In particular, through changing the arrangement and setting the position of the resilient return device 108 and the drive lever 114, the user may be able to release the positioning by pushing or pulling the drive lever 114.

Figure 1:
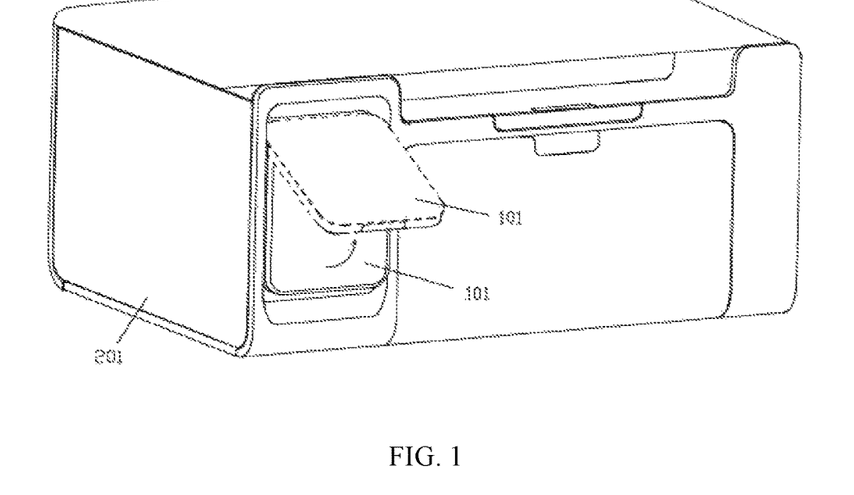
FIG. 1 illustrates a schematic diagram of an exemplary imaging device consistent with disclosed embodiments.
Figure 2:
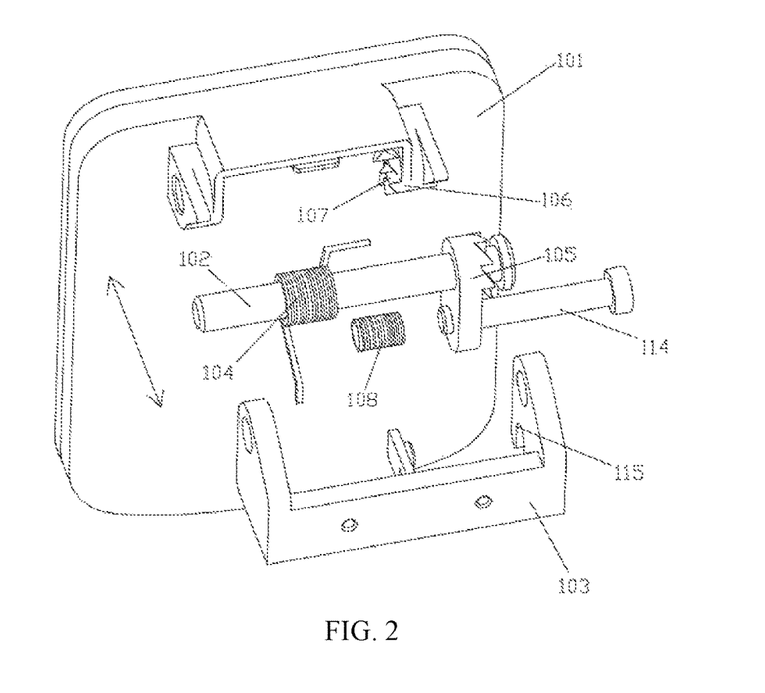
FIG. 2 illustrates an exploded view of an exemplary operation panel imaging device consistent with disclosed embodiments.
Figure 3:
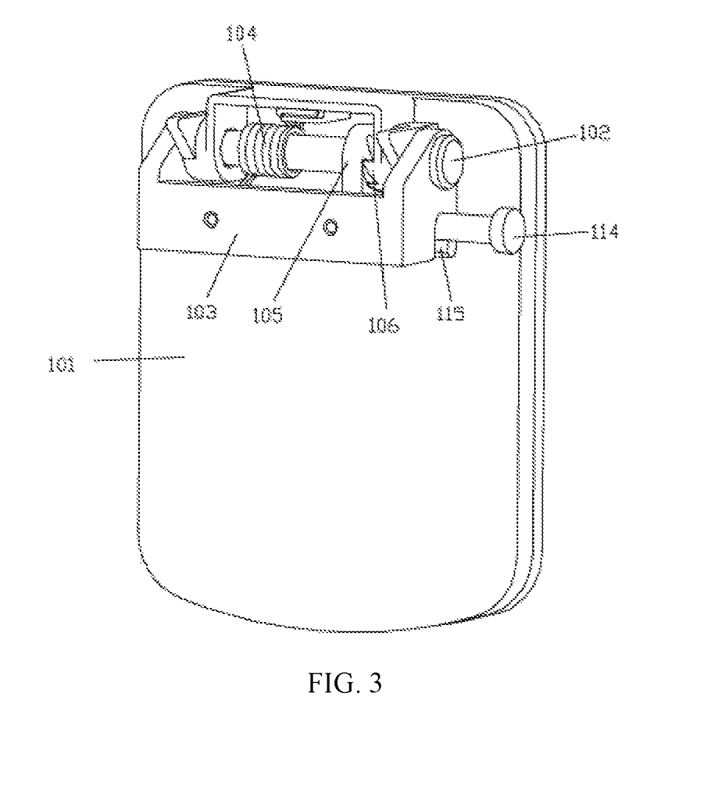
FIG. 3 illustrates a schematic diagram of an exemplary operation panel for imaging device consistent with disclosed embodiments.
Figure 4:
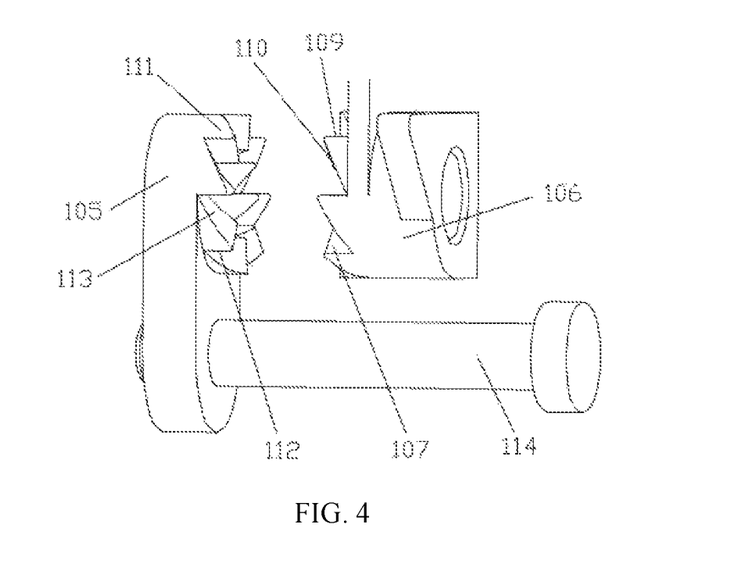
FIG. 4 illustrates a schematic diagram of an exemplary positioning system in an exemplary operation panel for imaging device consistent with disclosed embodiments.
Figure 5:
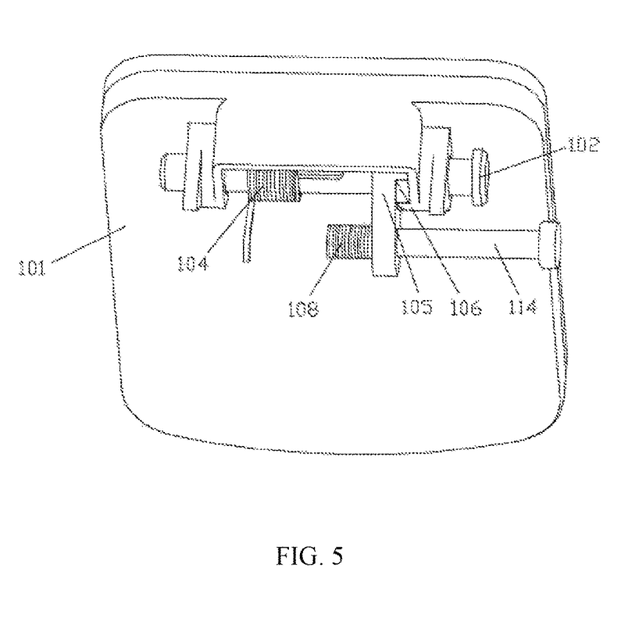
FIG. 5 illustrates a schematic diagram of an exemplary operation panel for imaging device where a connector is omitted consistent with disclosed embodiments.
Figure 6:
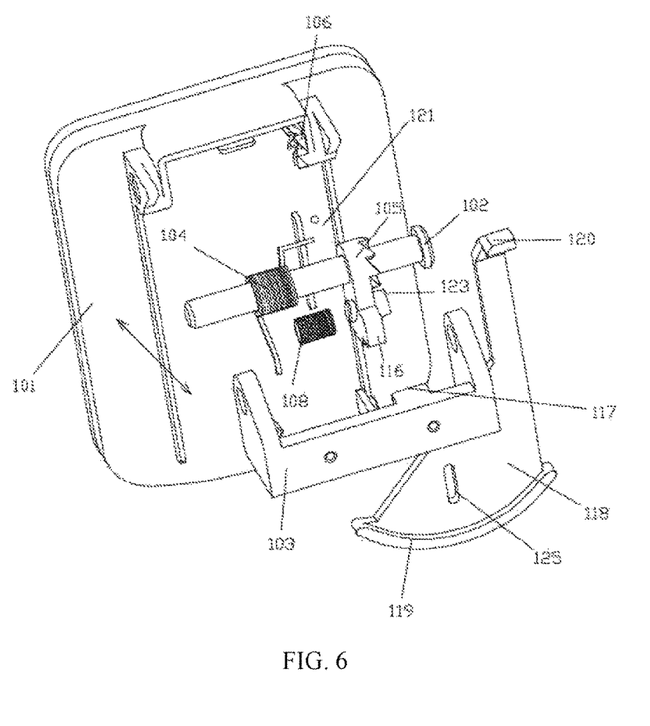
FIG. 6 illustrates an exploded view of another exemplary operation panel for imaging device consistent with disclosed embodiments.
Figure 7:
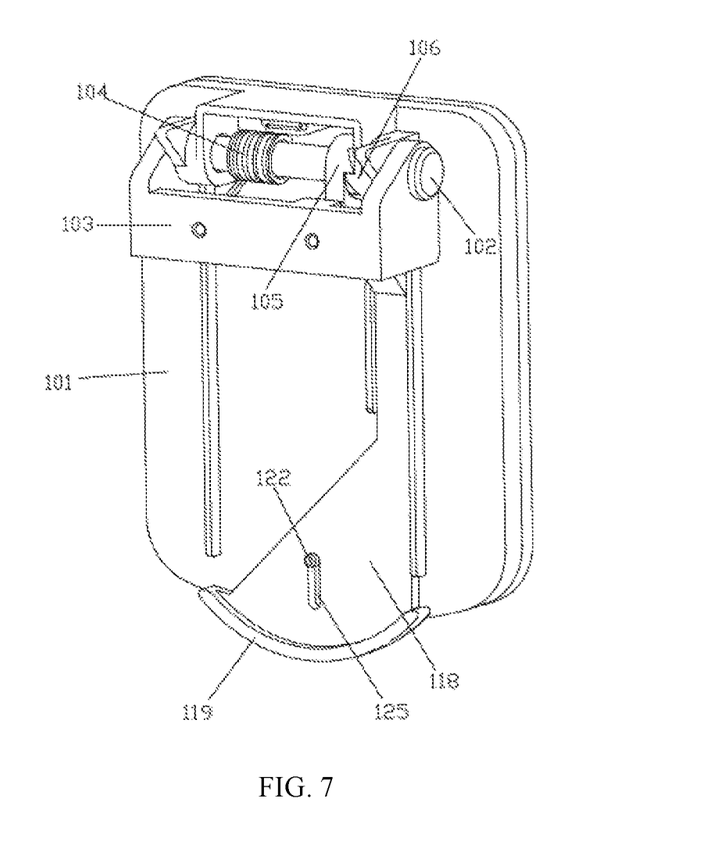
FIG. 7 illustrates a schematic diagram of another exemplary operation panel for imaging device consistent with disclosed embodiments.
Figure 8:
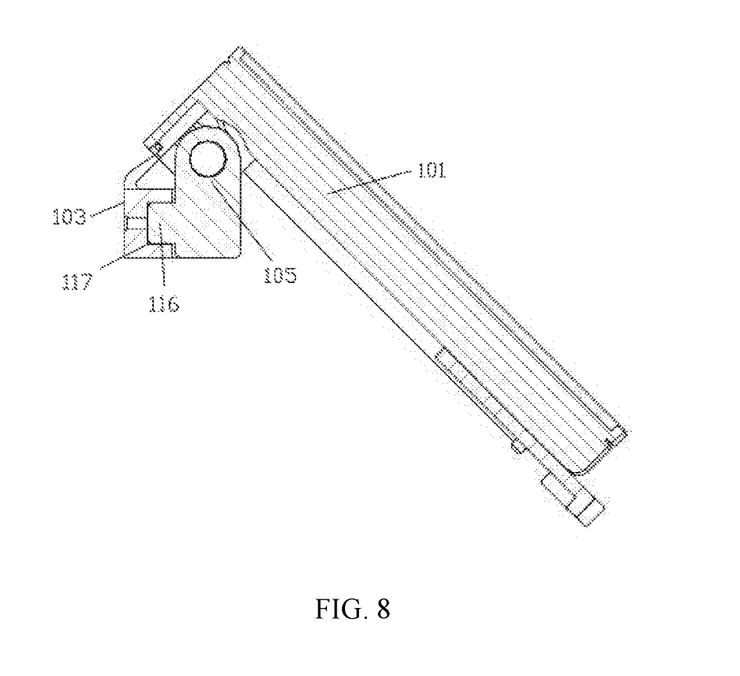
FIG. 8 illustrates a cross-sectional view of another exemplary operation panel for imaging device consistent with disclosed embodiments.
Figure 9:
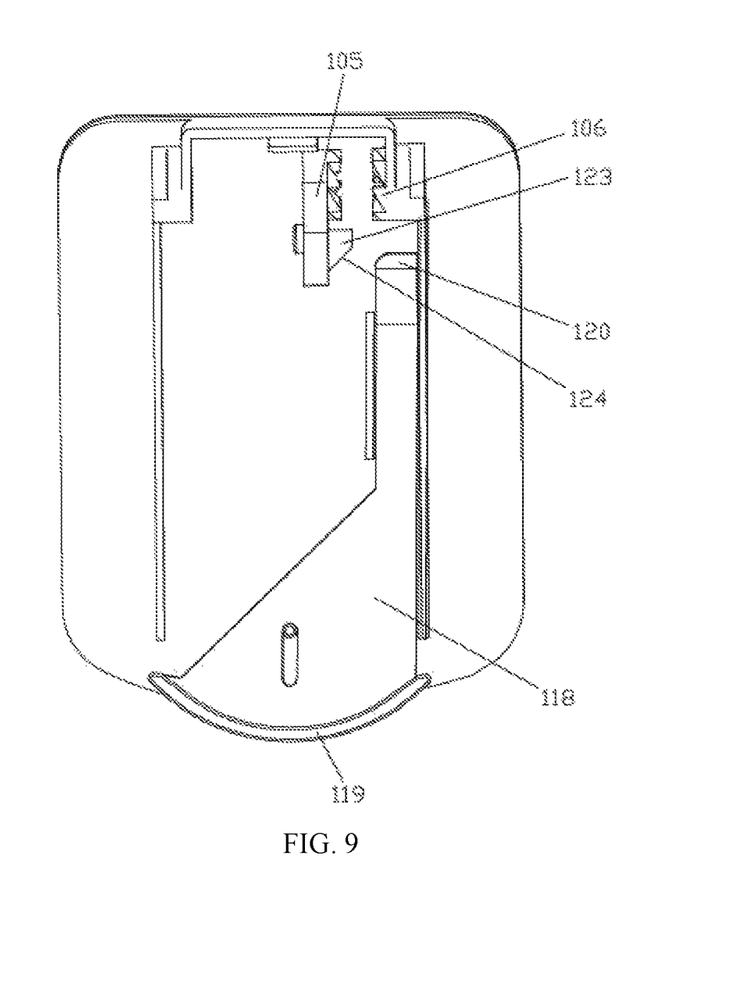
FIG. 9 illustrates a schematic diagram of another exemplary operation panel for imaging device where a connector, a pin shaft, and a resilient return device are omitted consistent with disclosed embodiments.
Figure 10:
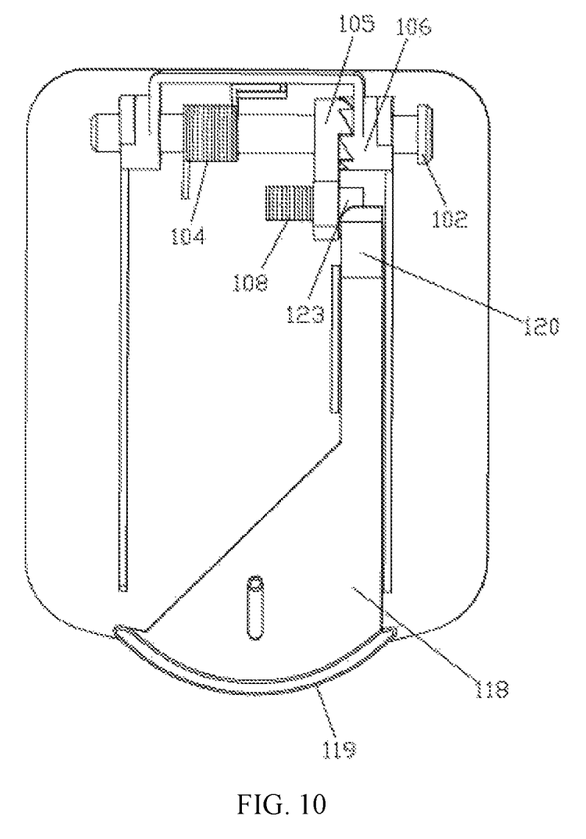
FIG. 10 illustrates a schematic diagram of another exemplary operation panel for imaging device where a connector is omitted consistent with disclosed embodiments.

In the disclosed embodiments, optionally, the connector 103 may be provided with a guide hole 115, and the drive lever 114 may be formed in the guide hole 115, such that the drive lever 114 may slide in the guide hole 115, along a direction parallel to axial direction the pin shaft 102. Thus, the sliding connection of the backstop 105 and the connector 103 may be achieved. Meanwhile, through providing the guide hole 115, the drive lever 114 may be able to slide in the direction parallel to the axial direction of the pin shaft 102, thereby realizing a reliable driving. In another embodiment, the backstop 105 may also be provided with a guide block 116, and the connector 103 may be provided with a guide groove 117 arranged parallel to the axial direction of the pin shaft 102. The guide block 116 may slide in the guide groove 117 to realize the sliding connection of the backstop 105 and the connector 103 (as shown in FIG. 8).

As shown in FIGS. 6-10, in the disclosed embodiments, optionally, the driving system may include a drive handle 118 having one end as a handle portion 119 and another end as a driver portion 120. The drive handle 118 may slide in a guide rail 121 of the panel body 101 in a direction parallel to the panel body 101 but perpendicular to the axial direction of the pin shaft 102. The panel body 101 may be provided with a stopper 122 configured to confine the drive handle 118 to the guide rail 121. The driving system may also include a drive block 123 having one end coupled to the backstop 105 and another end provided with a slant 124. The slant 124 may be arranged facing the driver portion 120 and in contact with the driver portion 120, such that the driver portion 120 may slide to apply a force, which is parallel to the axial direction of the pin shaft 102, to the drive block 123 and, accordingly, the drive block 123 may drive the backstop 105 to depart from the first ratchet wheel 106. The user may apply a force to the handle portion 119 of the drive handle 118, such that the driver portion 120 may slide in a direction parallel to the panel body 101 but perpendicular to the axial direction of the pin shaft 102. When the driver portion 120 is sliding, the driver portion 120 may contact the slant 124 of the drive block 123 and apply a force to the slant 124. Because the slant 124 is subjected to a component force parallel to the axial direction of the pin shaft 102, the drive block 123, pushed by the driving force, may drive the backstop 105 to depart from the first ratchet wheel 106, thereby releasing the positioning. Thus, the driving system may have a simple structure and easy operation. In one embodiment, the handle portion 119 may be provided at the bottom of the panel body 101. The drive block 123 and the positioning system may be provided at the top of the panel body 101. The user may be able to release the positioning by pushing the handle portion 119 upward. In another embodiment, the handle portion 119 may be provided on the top of the panel body 101, and the user may be able to release the positioning by pressing the handle portion 119 downward.

In the disclosed embodiments, optionally, the stopper 122 may be a protrusion, and the drive handle 118 may be provided with a stripe hole 125 arranged parallel to the guiding direction of the guide rail 121. The drive handle 118 may be sleeved on the protrusion through the stripe hole 125, and the protrusion may slide in the stripe hole 125. Thus, the stopper 122 may have a simple structure and reliable operation. In another embodiment, the stopper 122 may be a chute, a slide rail, or the like, and the stopper may function through confining the drive handle 118 or a sliding block arranged on the drive handle 118 in the chute or the slide rail.

Figure 11:
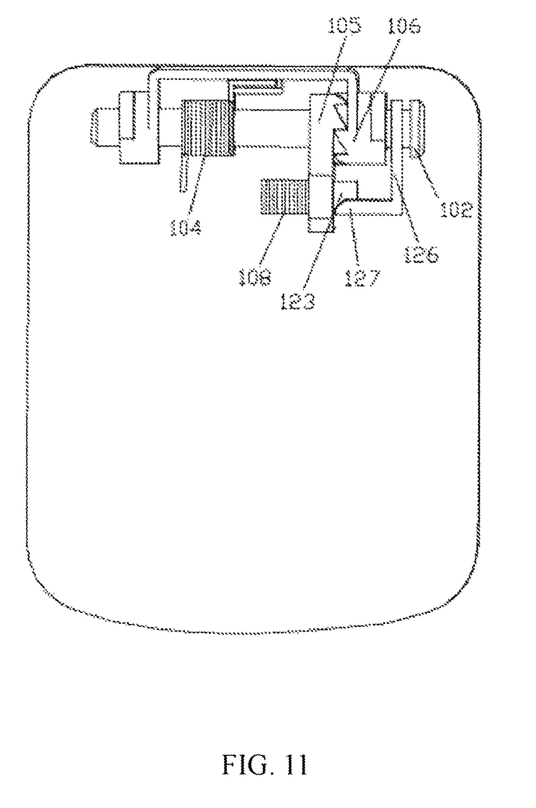
FIG. 11 illustrates a schematic diagram of another exemplary operation panel for imaging device consistent with disclosed embodiments.

As shown in FIG. 11, in the disclosed embodiments, optionally, the driving system may include a drive sleeve 126 arranged on the pin shaft 102. The drive sleeve 126 may be provided with a drive end 127. The driving system may also include the drive block 123, which may have one end coupled to the backstop 105 and another end provided with the slant 124. The slant 124 may be in contact with the drive end 127, such that when the drive end 127 is rotating around the pin shaft 102, the drive end 127 may apply a force, which is parallel to the axial direction of the pin shaft 102, to the drive block 123 and, accordingly, the drive block 123 may drive the backstop 105 to depart from the first ratchet wheel 106. The user may rotate the drive sleeve 126, such that the drive end 127 may rotate accordingly. The drive end 127 may contact the slant and apply a force to the slant 124. Because the slant 124 is subjected to a component force parallel to the axial direction of the pin shaft 102, the drive block 123 may drive the backstop 105 to depart from the first ratchet wheel 106, thereby releasing the positioning. The driving system may have a simple structure and easy operation.

Figure 12:
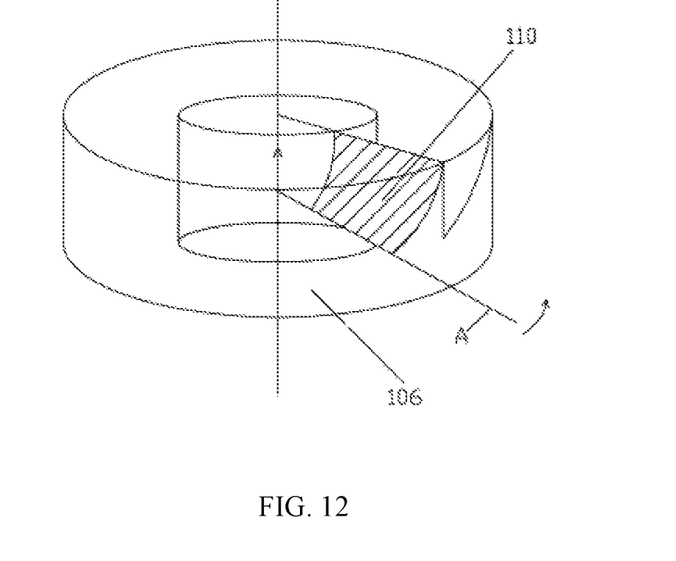
FIG. 12 illustrates a schematic diagram of an exemplary first ratchet wheel in an exemplary operation panel for imaging device consistent with disclosed embodiments.

As shown in FIG. 12, in the disclosed embodiments, optionally, the first slant 110 may be a first curved surface, and the first curved surface may be formed by the trajectory of rotating a straight-line A around the central axis of the first ratchet wheel 106 at a certain speed and, meanwhile, moving the straight-line A along the axis of the first ratchet wheel 106 at a certain speed, in which the straight-line A is extending radially along the first ratchet wheel 106. The second slant 113 may be a second curved surface, and the second curved surface may be fitted with the first curved surface. Thus, when a force is generated between the first curved surface and the second curved surface, the direction of the force may be perpendicular to both the first curved surface and the second curved surface. Thus, the first surface and the second surface may be more stable when they are relatively sliding or relatively stationary.

Figure 13:
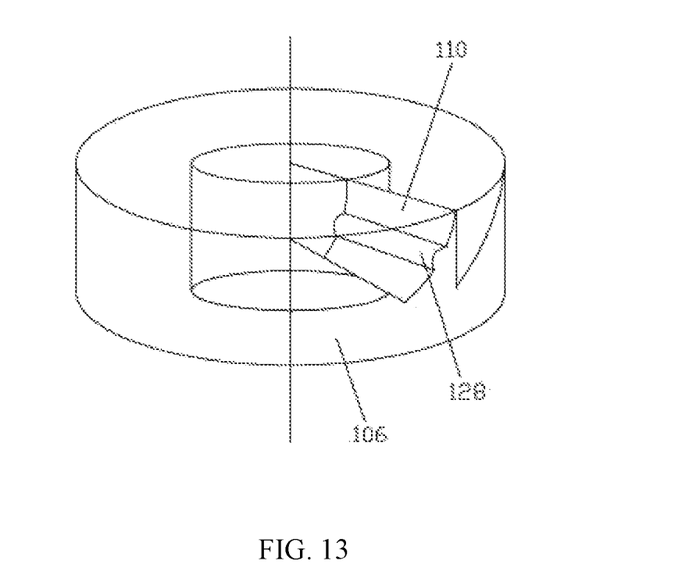
FIG. 13 illustrates a schematic diagram of another exemplary first ratchet wheel in an exemplary operation panel for imaging device consistent with disclosed embodiments.

As shown in FIG. 13, in the disclosed embodiments, optionally, a curved convex platform 128 may be provided on the first slant 110 or the second slant 113, thereby reducing the contact area between the first slant 110 and the second slant 113. Accordingly, the frictional force between the first slant 110 and the second slant 113 may be reduced, and the sliding between the first slant 110 and the second slant 113 may be smoother.

The present disclosure also provides an imaging device comprising a house 201 and an operation panel according to any one of the disclosed embodiments. The house 201 may be coupled to the connector 103.

In the disclosed embodiments, when the user desires to adjust the angle of the panel body 101 with respect to the house 201, the panel body 101 may be turned over from the initial position. When turning over the panel body 101, the panel body 101 may rotate around the pin shaft 102 with respect to the connector 103, during which the panel body 101 may drive the first ratchet wheel 106 to rotate forward around the pin shaft 102 and, meanwhile, the torsion spring 104 may be compressed. When the user adjusts the panel body 101 to the desired position and releases the panel body 101, the compressed torsion spring 104 may apply a force to the connector 103 and the panel body 101, such that the panel body 101 may rotate reversely with respect to the connector 103. Accordingly, the panel body 101 may drive the first ratchet wheel 106 to rotate reversely about the pin shaft 102. At this moment, the backstop 105 may be configured to clamp the first paw 107 of the first ratchet wheel 106 so as to position the first ratchet wheel 106. Thus, the panel body 101 may be positioned with respect to the connector 103, which may facilitate the user to view the information displayed on the display panel of the panel body 101 and perform the related input operation from a desired angle. Thus, the influence of the reflection on the display information may be reduced, and the visibility of the information displayed on the operation panel and operation convenience may be improved. When the positioning of the panel body 101 is desired to be released, the user may rely on the driving system to drive the backstop 105 in a direction parallel to the axial direction of the pin shaft 102, such that the backstop 105 may depart from the first ratchet wheel 106. Thus, the backstop 105 may no longer clamp the first pawls 107, and the positioning of the panel body 101 may be released. The compressed torsion spring 104 may apply a force the connector 103 and the panel body 101, such that the panel body 101 may rotate reversely around the connector 103, then the panel body 101 may be recovered to the initial position, realizing a convenient operation. Finally, it should be noted that, the above embodiments are merely illustrative of the technical solutions of the present disclosure and are not intended to limit the scope of the present disclosure. The foregoing description of the disclosed embodiments will enable those skilled in the art to make or use the invention. Various modifications to these embodiments will be readily apparent to those skilled in the art, and the generic principles defined herein may be applied to other embodiments without departing from the spirit or scope of the invention. Accordingly, the claims cover all modifications made by those skilled in the art to without departing from the spirit or scope of the invention.

What is claimed is:

1. An operation panel for an imaging device, comprising:
a panel body, wherein the panel body is hinged to a connector through a pin shaft, the connector is coupled to a house of the imaging device, a torsion spring is sleeved on the pin shaft, the torsion spring has a first torsion arm fixedly coupled to the panel body and a second torsion arm fixedly coupled to the connector;
a positioning system, comprising:

a first ratchet wheel sleeved on the pin shaft and coupled to the panel body, wherein the panel body drives the first ratchet wheel to rotate around the pin shaft, and a backstop arranged on the connector, wherein the backstop is configured to cooperate with the first ratchet wheel so as to enable the first ratchet wheel to be rotated forward, and configured to clamp a first paw of the first ratchet wheel when the first ratchet wheel rotates reversely so as to position the first ratchet wheel, and the backstop is coupled to the connector in a sliding manner and slides at least in a direction parallel to an axial direction of the pin shaft; and a driving system coupled to the backstop and configured to drive the backstop to slide at least in the direction parallel to the axial direction of the pin shaft, such that the backstop departs from the first ratchet wheel.

2. The operation panel according to claim 1, further comprising:

a resilient return device coupled between the connector and the backstop, wherein the resilient return device is disposed parallel to the axial direction of the pin shaft, and configured to apply a force to the backstop, such that the backstop returns to a position where the backstop is able to cooperate with the first ratchet wheel to realize a positioning.

3. The operation panel according to claim 1, wherein:

the first pawl is provided at a first end surface of the first ratchet wheel, and a second end surface of the first ratchet wheel is fixedly coupled to the panel body, the first pawl includes a plurality of first planes distributed circumferentially along the first ratchet wheel, a first plane extends in the axial direction and a radial direction of the first ratchet wheel, a top of the first plane and a bottom of an adjacent first plane are coupled by a first slant to form a protrusion, and the first plane and the adjacent first plane forming the protrusion each has a first angel with respect to the first slant; and the backstop is a second ratchet wheel, wherein the second ratchet wheel is sleeved on the pin shaft and slidably coupled to the pin shaft, a first end surface of the second ratchet wheel is provided with a second paw, the second pawl includes a plurality of second planes distributed circumferentially along the second ratchet wheel, a second plane extends in an axial direction and a radial direction of the second ratchet wheel, a top of the second plane and a bottom of an adjacent second plane are coupled by a second slant to form a protrusion, and the second plane and the adjacent second plane forming the protrusion each has a second angel with respect to the second slant; and the second ratchet wheel cooperates with the first ratchet wheel, wherein the second plane is configured to be engaged with the first plane to position the first ratchet wheel, and the second slant slides relative to the first slant to forward rotate the first ratchet wheel with respect to the second ratchet wheel.

4. The operation panel according to claim 3, wherein:

the first angle is configured to be approximately 30 to 60 degrees; and the second angle is configured to be approximately 30 to 60 degrees.

5. The operation panel according to claim 1, wherein:

the driving system is a drive lever coupled to the backstop.

6. The operation panel according to claim 5, wherein:

the connector is provided with a guide hole, and the drive lever is disposed in the guide hole, and slides in the guide hole along a direction parallel to the axial direction the pin shaft.

7. The operation panel according to claim 1, wherein the driving system further includes:

a drive handle having one end as a handle portion and another end as a driver portion, wherein the drive handle slides in a guide rail of the panel body in a direction parallel to the panel body but perpendicular to the axial direction of the pin shaft, and the panel body is provided with a stopper configured to confine the drive handle to the guide rail; and a drive block having one end coupled to the backstop and another end provided with a slant, wherein the slant is arranged facing the driver portion and in contact with the driver portion, such that the driver portion slides to apply a force, which is parallel to the axial direction of the pin shaft, to the drive block, to enable the drive block to drive the backstop to depart from the first ratchet wheel.

8. The operation panel according to claim 7, wherein:

the stopper is a protrusion;

the drive handle is provided with a stripe hole arranged parallel to a guiding direction of the guide rail, and the drive handle is sleeved on the protrusion through the stripe hole; and the protrusion slides in the stripe hole.

9. The operation panel according to claim 1, wherein the driving system further includes:

a drive sleeve arranged on the pin shaft and provided with a drive end; and a drive block having one end coupled to the backstop and another end provided with a slant, wherein the slant is in contact with the drive end, such that when the drive end is rotating around the pin shaft, the drive end applies a force, which is parallel to the axial direction of the pin shaft, to the drive block, to enable the drive block to drive the backstop to depart from the first ratchet wheel.

10. An imaging device, comprising:

a house; and an operation panel for the imaging device, wherein:

the operation panel for the imaging device comprising:

a panel body, wherein the panel body is hinged to a connector through a pin shaft, the connector is coupled to a house of the imaging device, a torsion spring is sleeved on the pin shaft, the torsion spring has a first torsion arm fixedly coupled to the panel body and a second torsion arm fixedly coupled to the connector;

a positioning system, comprising:

a first ratchet wheel sleeved on the pin shaft and coupled to the panel body, wherein the panel body drives the first ratchet wheel to rotate around the pin shaft, and a backstop arranged on the connector, wherein the backstop is configured to cooperate with the first ratchet wheel so as to enable the first ratchet wheel to be rotated forward, and configured to clamp a first paw of the first ratchet wheel when the first ratchet wheel rotates reversely so as to position the first ratchet wheel, and the backstop is coupled to the connector in a sliding manner and slides at least in a direction parallel to an axial direction of the pin shaft; and a driving system coupled to the backstop and configured to drive the backstop to slide at least in the direction parallel to the axial direction of the pin shaft, such that the backstop departs from the first ratchet wheel, and wherein the house is coupled to the connector.

11. The imaging device according to claim 10, wherein the operation panel further comprising:
a resilient return device coupled between the connector and the backstop,
wherein the resilient return device is disposed parallel to the axial direction of the pin shaft, and configured to apply a force to the backstop, such that the backstop returns to a position where the backstop is able to cooperate with the first ratchet wheel to realize a positioning.

12. The imaging device according to claim 10, wherein:
the first pawl is provided at a first end surface of the first ratchet wheel, and a second end surface of the first ratchet wheel is fixedly coupled to the panel body, the first pawl includes a plurality of first planes distributed circumferentially along the first ratchet wheel, a first plane extends in the axial direction and a radial direction of the first ratchet wheel, a top of the first plane and a bottom of an adjacent first plane are coupled by a first slant to form a protrusion, and the first plane and the adjacent first plane forming the protrusion each has a first angel with respect to the first slant; and
the backstop is a second ratchet wheel, wherein the second ratchet wheel is sleeved on the pin shaft and slidably coupled to the pin shaft, a first end surface of the second ratchet wheel is provided with a second paw, the second pawl includes a plurality of second planes distributed circumferentially along the second ratchet wheel, a second plane extends in an axial direction and a radial direction of the second ratchet wheel, a top of the second plane and a bottom of an adjacent second plane are coupled by a second slant to form a protrusion, and the second plane and the adjacent second plane forming the protrusion each has a second angel with respect to the second slant; and
the second ratchet wheel cooperates with the first ratchet wheel, wherein the second plane is configured to be engaged with the first plane to position the first ratchet wheel, and the second slant slides relative to the first slant to forward rotate the first ratchet wheel with respect to the second ratchet wheel.

13. The imaging device according to claim 12, wherein:
the first angle is configured to be approximately 30 to 60 degrees; and
the second angle is configured to be approximately 30 to 60 degrees.

14. The imaging device according to claim 10, wherein:
the driving system is a drive lever coupled to the backstop.

15. The imaging device according to claim 14, wherein:
the connector is provided with a guide hole, and
the drive lever is disposed in the guide hole, and slides in the guide hole along a direction parallel to the axial direction the pin shaft.

16. The imaging device according to claim 10, wherein the driving system of the operation panel further includes:
a drive handle having one end as a handle portion and another end as a driver portion, wherein the drive handle slides in a guide rail of the panel body in a direction parallel to the panel body but perpendicular to the axial direction of the pin shaft, and the panel body is provided with a stopper configured to confine the drive handle to the guide rail; and
a drive block having one end coupled to the backstop and another end provided with a slant, wherein the slant is arranged facing the driver portion and in contact with the driver portion, such that the driver portion slides to apply a force, which is parallel to the axial direction of the pin shaft, to the drive block, to enable the drive block to drive the backstop to depart from the first ratchet wheel.

17. The imaging device according to claim 16, wherein:
the stopper is a protrusion;
the drive handle is provided with a stripe hole arranged parallel to a guiding direction of the guide rail, and the drive handle is sleeved on the protrusion through the stripe hole; and
the protrusion slides in the stripe hole.

18. The imaging device according to claim 10, wherein the driving system of the operation panel further includes:
a drive sleeve arranged on the pin shaft and provided with a drive end; and
a drive block having one end coupled to the backstop and another end provided with a slant, wherein the slant is in contact with the drive end, such that when the drive end is rotating around the pin shaft, the drive end applies a force, which is parallel to the axial direction of the pin shaft, to the drive block, to enable the drive block to drive the backstop to depart from the first ratchet wheel.

\* \* \* \* \*